United States Patent
Malodobra-Mazur et al.

(10) Patent No.: US 12,534,769 B2
(45) Date of Patent: Jan. 27, 2026

(54) PRIMER SETS FOR THE DETECTION OF HUMAN PAPILLOMAVIRUS TYPE 16 (HPV16) AND HUMAN PAPILLOMAVIRUS TYPE 18 (HPV18), THE METHOD OF DETECTING HPV16 AND HPV18 INFECTIONS, THE USE OF A PRIMER SET FOR THE DETECTION OF HPV16 AND HPV18 INFECTIONS

(71) Applicant: GENOMTEC S.A., Wroclaw (PL)

(72) Inventors: Malgorzata Malodobra-Mazur, Wroclaw (PL); Miron Tokarski, Brzeg (PL); Izabela Pielka, Konopiska (PL)

(73) Assignee: GENOMTEC S.A., Wroclaw (PL)

( * ) Notice: Subject to any disclaimer, the term of this patent is extended or adjusted under 35 U.S.C. 154(b) by 989 days.

(21) Appl. No.: 17/636,291

(22) PCT Filed: Sep. 8, 2020

(86) PCT No.: PCT/PL2020/050064
§ 371 (c)(1),
(2) Date: Feb. 17, 2022

(87) PCT Pub. No.: WO2021/049962
PCT Pub. Date: Mar. 18, 2021

(65) Prior Publication Data
US 2023/0002839 A1 Jan. 5, 2023

(30) Foreign Application Priority Data

Sep. 9, 2019 (PL) .................................. P.431073

(51) Int. Cl.
*C12Q 1/6844* (2018.01)
*C12Q 1/70* (2006.01)

(52) U.S. Cl.
CPC .......... *C12Q 1/708* (2013.01); *C12Q 1/6844* (2013.01)

(58) Field of Classification Search
None
See application file for complete search history.

(56) References Cited

FOREIGN PATENT DOCUMENTS

| CN | 104805218 A | 7/2015 |
| CN | 106939359 A | 7/2017 |
| CN | 107557492 A | 1/2018 |
| CN | 110093459 A | 8/2019 |

OTHER PUBLICATIONS

Kumvongpin et al., Detection Assay for HPV16 and HPV18 by Loop Mediated Isothermal Amplification With Lateral Flow Dipstick Tests, Molecular Medicine Reports, 2017, 15(5), 3203-3209.
Rohatensky et al., "Assessing the Performance of a Loop Mediated Isothermal Amplification (LAMP) Assay for the Detection and Subtyping of High-Risk Suptypes of Human Papilloma Virus (HPV) for Oropharyngeal Squamous Cell Carcinoma (OPSCC) Without DNA Purification"; BMC Cancer, 2018, 18: 166.

*Primary Examiner* — Nicole Kinsey White
(74) *Attorney, Agent, or Firm* — Arrigo, Lee, Guttman & Mouta-Bellum LLP

(57) ABSTRACT

The first object of the invention is primer sets for amplifying the nucleotide sequence of the L2 gene of human papillomavirus type 16 or L1 gene of human papillomavirus type 18. The second object of the invention is a method for detecting HPV16 or HPV18 viruses. Another object of the invention is a method of detecting HPV16 and HPV18 infections. A fourth object of the invention is a kit for detecting HPV16 or HPV18 infections.

11 Claims, 4 Drawing Sheets
Specification includes a Sequence Listing.

PRIMER SETS FOR THE DETECTION OF HUMAN PAPILLOMAVIRUS TYPE 16 (HPV16) AND HUMAN PAPILLOMAVIRUS TYPE 18 (HPV18), THE METHOD OF DETECTING HPV16 AND HPV18 INFECTIONS, THE USE OF A PRIMER SET FOR THE DETECTION OF HPV16 AND HPV18 INFECTIONS

REFERENCE TO SEQUENCE LISTING SUBMITTED ELECTRONICALLY

The instant application contains a Sequence Listing which has been submitted electronically in ASCII format and is hereby incorporated by reference in its entirety. Said ASCII copy, created on Sep. 6, 2022, is named 6943_ST25.txt and is 7,472 bytes in size.

FIELD OF INVENTION

The present invention relates to primer sets for the detection of viruses belonging to the human papillomavirus family, genotypes 16 and 18 (Human papillomavirus type 16 and 18), a method of detecting viruses from the human papillomavirus family using a primer set, and the use of a primer set to detect viruses belonging to the human papillomavirus family. The invention has applications in medical diagnosis.

BACKGROUND OF THE INVENTION

Human papillomaviruses are spherical viruses whose genetic material is a double strand of DNA. The human papillomavirus group comprises over 200 different genotypes, classified by differences in DNA sequence, of which approximately 40 are sexually transmitted. From this group, 14 oncogenic genotypes with a high risk of developing neoplasms, including cervical cancer, anal cancer, as well as head and neck cancers, were identified, of which genotype 16 and genotype 18 are the most commonly diagnosed. According to WHO, HPV16 is responsible for 55% of cervical cancer cases, HVP18 is the cause of another 15%, the remaining cases of cervical cancers are caused by infection with other oncogenic genotypes of the human papillomavirus (HPV), including: 31, 33, 35, 39, 45, 51, 52, 56, 58, 68, 73, 82.

The use of primers in the LAMP method for the diagnosis of HPV16 and/or HPV18 viruses is known from the patent applications published so far: CN102952894A; CN103114033A; CN104805218; CN106939359A; CN10755492A; CN106148571A; EP2192199A1; US2009035750A1; WO2014092647. The LAMP method has for example been disclosed in WO0028082, WO0224902. However, the mentioned patent applications do not describe the sensitivity and detection limit of HPV16 and HPV18 viruses. The detection method in the above-mentioned patent applications does not allow for their quantitative measurement, and the detection is of the end-point type, using an agarose gel or other markers based on the color change of the reaction mixture in the case of a positive result of the amplification reaction (Hydroxy-Naphthol-Blue, Calceine).

Therefore, there is still a need to provide such a set of primers utilized in the diagnostic method in primary care for the detection and genotyping of human papillomaviruses using the LAMP method, which allows the detection of a virus with a very low detection limit ($\geq 5$ GEq/µl) in a short time ($\leq 15$ min).

Unexpectedly, the above problem was solved by the present invention.

BRIEF DESCRIPTION OF THE DRAWINGS

Exemplary embodiments of the invention are shown in the figures, in which:

FIG. 1 Line 1: mass marker (Quick-Load® Purple 100 bp DNA Ladder, NewEngland Biolabs); line 2: 5 GEq HPV16; line 3: 10 GEq HPV16; line 4: 20 GEq HPV16; line 5: 25 GEq HPV16; line 6: 50 GEq HPV16; line 7: 100 GEq HPV16; line 8: 1 000 GEq HPV16; line 9: 10 000 GEq HPV16; line 10: NTC.

FIG. 3: Line 1: mass marker (Quick-Load® Purple 100 bp DNA Ladder, NewEngland Biolabs); line 2: 10 000GEq HPV18; line 3: 10000 GEq HPV18; line 4:100 GEq HPV18; line 5: 50 GEq HPV18; line 6: 25 GEq HPV18; line 7: 20 GEq HPV18; line 8: 10 GEq HPV18; line 9: 5 GEq HPV18; line 10: NTC.

FIG. 5: Line 1: mass marker (Quick-Load® Purple 100 bp DNA Ladder, NewEngland Biolabs); Line 2: HPV16; Line 3: HPV18; Line 4: *Streptococcus agalactia*; Line 5: *Streptococcus pyogenes*; Line 6: *Streptococcus* mutant; Line 7: *Staphylococcus epidermidis*; Line 8: *Staphylococcus aureus*; Line 9: *Campylobacter jejuni*; Line 10: *Trepanoma pallidium*; Line 11:HSV1; Line 12: HSV2; Line 13: *Candida albicans*; Line 14: *Borrelia afzeli*; Line 15: *Borrelia burgdorferi sensu stricto*; Line 16: *Homo sapiens*; Line 17: NTC.

FIG. 6: Line 1: mass marker (Quick-Load® Purple 100 bp DNA Ladder, New-England Biolabs); Line 2: HPV16; Line 3: HPV18; Line 4: *Streptococcus agalactia*; Line 5: Streptococcus pyogenes; Line 6: *Streptococcus* mutant; Line 7: *Staphylococcus epidermidis*; Line 8: *Staphylococcus aureus*; Line 9: *Campylobacter jejuni*; Line 10: *Trepanoma pallidium*; Line 11: HSV1; Line 12: HSV2; Line 13: *Candida albicans*; Line 14: *Borrelia afzeli*; Line 15: *Borrelia burgdorferi* sensu stricto; Line 16: *Homo sapiens*; Line 17: NTC.

DETAILED DESCRIPTION OF THE INVENTION

Figure 1:
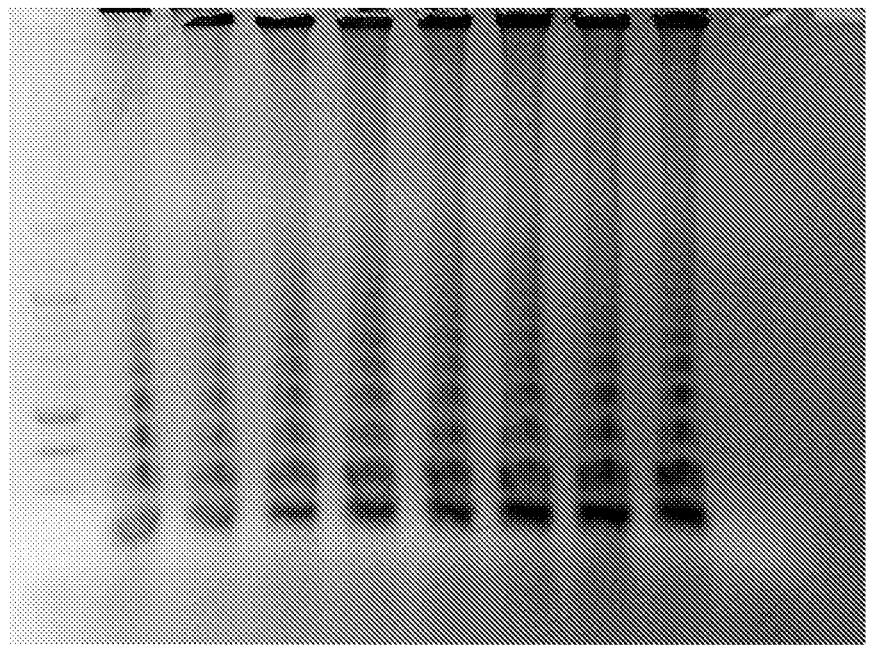
FIG. 1 (for HPV16) shows the sensitivity characteristics of the method, where a specific signal was obtained with the matrices:
  HPV16: Human Papillomavirus (HPV) Type 16 DNA, 1st WHO International Standard)—06/202, NIBSC in the range of 10,000—5 GEq (Genomic Equivalent) HPV16 and HPV18, but no product in NTC.

The first object of the invention is primer sets for amplifying the nucleotide sequence of the L2 gene of human papillomavirus type 16 or L1 gene of human papillomavirus type 18, characterized in that they contain internal primer sets having the following nucleotide sequences a) and b) for HPV16, and c) and d) for HPV18, as well as external primer sets containing the following nucleotide sequences e) and f) for HPV16, and g) and h) for HVP18:

a) 5' CATGCAAACAGGCAGGTA 3' (nucleic sequence SEQ ID NO: 3 or the sequence complementary thereto or resulting from single nucleotide exchanges, single nucleotide substitutions or deletions)—(any 18 to 30 bp nucleotide sequence complementary to the sequence of the L2 gene) linked or not by TTTT bridge to the sequence 5' ATTTGATCAGCAATAGTTTTGCCTT 3'-(nucleic sequence SEQ ID NO: 5 or the sequence complementary thereto or resulting from single nucleotide exchanges, single nucleotide substitution or deletion)

b) 5' ATATACCCAGTGCGTCCG 3'-(nucleic sequence SEQ ID NO: 4 or the sequence complementary thereto or resulting from single nucleotide exchanges, single nucleotide substitution or deletion)—(any 18 to 30 bp nucleotide sequence complementary to the sequence of the L2 gene) linked or not by TTTT bridge with the sequence 5' GGAAGTATGGGTGTATTTTTTGGTG 3'-(nucleic sequence SEQ ID NO: 6 or a sequence complementary thereto or resulting from single nucleotide exchanges, single nucleotide substitution or deletion)

c) 5' CCCTATTTTTTGCAGATGGC 3' (nucleic sequence SEQ ID NO: 9 or the sequence complementary thereto or resulting from single nucleotide exchanges, single nucleotide substitutions or deletions)—(any 18 to 30 bp nucleotide sequence complementary to the sequence of the L1 gene) linked or not by TTTT bridge with the sequence 5' AGGAGGTGGAAGATATACGGTATT 3'-(nucleic sequence SEQ ID NO: 11 or the sequence complementary thereto or resulting from single nucleotide exchanges, single nucleotide substitution or deletion)

d) 5' CCAACAGTTAATAATCTAGAGCT 3'-(nucleic sequence SEQ ID NO: 10 or the sequence complementary thereto or resulting from single nucleotide exchanges, single nucleotide substitutions or deletions)—(any 18 to 30 bp nucleotide sequence complementary to the sequence of the L1 gene) linked or not by TTTT bridge with the sequence 5' GGCAAGAGTTGTAAATACCGATGA 3'-(nucleic sequence SEQ ID NO: 12 or the sequence complementary thereto or resulting from single nucleotide exchanges, single nucleotide substitution or deletion)

e) 5' AAAACGTGCATCGGCTAC 3' nucleic sequence SEQ ID NO: 1 or the sequence complementary thereto or resulting from single nucleotide exchanges, single nucleotide substitution or deletion, and f) 5' GAGGCCTTGTTCCCAATG 3' nucleic sequence SEQ ID NO: 2 or the sequence complementary thereto or resulting from single nucleotide exchanges, single nucleotide substitution or deletion g) 5' CCTAAGAAACGTAAACGTGTT 3' nucleic sequence SEQ ID NO: 7 or the sequence complementary thereto or resulting from single nucleotide exchanges, single nucleotide substitution or deletion, and h) 5' CAGGAACCCTAAAATATGGATT 3' nucleic sequence SEQ ID NO: 8 or the sequence complementary thereto or resulting from single nucleotide exchanges, single nucleotide substitution or deletion.

In a preferred embodiment of the invention, the primer set comprises a set of loop primer sequences comprising nucleic sequences identical or complementary to the HPV16 L2 gene SEQ ID NO: 13-5'CCTTAGGTATAATGTCAGGTGGACA 3' and SEQ ID NO: 14: 5' GGTTAGGAATTGGAACAGGGTC 3' or the sequences complementary thereto or sequences resulting from single nucleotide exchanges, single nucleotide substitutions or deletions.

In a further preferred embodiment of the invention, the primer set comprises nucleic sequences identical or complementary to the HPV18 L1 gene SEQ ID NO: 15: 5' GTCACTAGGCCGCCACAA 3' and SEQ ID NO: 16: 5' CTCCCACAAGCATATTTTATCATGC 3', or the sequences complementary thereto or sequences resulting from single nucleotide exchanges, single nucleotide substitutions or deletions.

The second object of the invention is a method for detecting Human papillomavirus type 16 or type 18, characterized in that a selected region of the HPV16 and HPV18 nucleic sequence is amplified using a primer set according to the first object of the invention, wherein the amplification method is LAMP method.

In a preferred embodiment, amplification is carried out with a temperature profile:

HPV16: 65° C., 30 min
HPV18 64° C., 40 min.

In a further preferred embodiment of the invention, the end-point reaction is carried out at a temperature profile of 80° C., 5 min.

A third object of the invention is a method of detecting HPV16 and HPV18 infections, characterized in that it comprises a detection method as defined in the second object of the invention.

A fourth object of the invention is a kit for the detection of HPV16 or HPV18 infection, characterized in that it comprises a primer set as defined in the first object of the invention.

In a preferred embodiment of the invention, the infection detection kit contains 12.5 µl of WarmStart LAMP Master Mix.

In a further preferred embodiment of the invention, individual amplification primers as defined in the first object of the invention, wherein have the following the primers concentrations: HPV16: 0.12 µM F3, 0.12 µM B3, 0.96 µM FIP, 0.96 µM BIP, 0.24 µM LoopF, 0.24 µM LoopB; and HPV18: 0.15 µM F3, 0.15 µM B3, 1.20 µM FIP, 1.20 µM BIP, 0.30

µM LoopF, 0.30 µM LoopB; BSA—0.25 mg/ml; D-(+)-Trehalose dihydrate—6%; Fluorescent marker interacting with double-stranded DNA—EvaGreen ≤1× or Fluorescent Dye in the amount of ≤0.5 µl or GreenFluorescent Dye in the amount of ≤1 µl or Syto-13≤16 µM or SYTO-82 ≤16 µM or other fluorescent dye interacting with double-stranded DNA at a concentration that does not inhibit the amplification reaction.

The advantage of the primer sets according to the invention for the detection of HPV16 and HPV18, as well as the method of detecting HPV16 and HPV18 infections and the method of detecting the amplification products, is the possibility of their use in medical diagnosis at the point of care (POC) with the target application in the form of portable genetic analyzer. The lyophilization of the reaction mixtures according to the invention allows the diagnostic kits to be stored at room temperature without reducing the diagnostic parameters of the tests. On the other hand, the use of a fluorescent dye to detect the amplification product increases the sensitivity of the method, allows to lower the detection limit (up to 5 GEq/µl), and also enables quantitative measurement of the virus in the test sample.

EXAMPLE 1 PRIMER SEQUENCES

The sequences of specific oligonucleotides used for the detection of HPV16 genetic material using LAMP technology are presented and characterized below.

1. HPV16 L2F3 oligonucleotide sequence: 5' AAAACGTGCATCGGCTAC 3' (SEQ ID NO: 1) is a sequence identical to the HPV16 L2 gene (5'-3' strand) which is 3' adjacent to the HPV16 L2F2 primer.
2. HPV16 L2B3 oligonucleotide sequence: 5' GAGGCCTTGTTCCCAATG 3' (SEQ ID NO: 2) is a complementary fragment of the HPV16 L2 gene (5'-3' strand) 174 nucleotides away from the 3' end of oligonucleotide 1.
3. HPV16 L2F2 oligonucleotide sequence: 5' CATGCAAACAGGCAGGTA 3' (SEQ ID NO: 3) is a sequence identical to the HPV16 L2 gene (5'-3' strand) 15 nucleotides away from the 3' end of oligonucleotide 1.
4. HPV16 L2B2 oligonucleotide sequence: 5' ATATACCCAGTGCGTCCG 3' (SEQ ID NO: 4) is a complementary fragment of the HPV16 L2 gene (5'-3' strand) 154 nucleotides away from the 3' end of oligonucleotide 1.
5. HPV16 L2F1c oligonucleotide sequence: 5' ATTTGATCAGCAATAGTTTTGCCTT (SEQ ID NO:5) 3' is a complementary fragment of the HPV16 L2 gene (5'-3' strand) 63 nucleotides away from the 3' end of oligonucleotide 1.
6. HPV16 L2B1c oligonucleotide sequence: 5' GGAAGTATGGGTGTATTTTTTGGTG (SEQ ID NO: 6) 3' is a sequence identical to the HPV16 L2 gene (5'-3' strand) 98 nucleotides away from the 3' end of oligonucleotide 1.
7. HPV16 L2LoopF sequence: 5' CCTAGGTATAATGTCAGGTGGACA 3' (SEQ ID NO: 13)
8. HPV16 L2LoopB oligonucleotide sequence: 5' GGTTAGGAATTGGAACAGGGTC 3' (SEQ ID NO: 14)

The sequences of the F1c and F2 oligonucleotides have been preferably linked by a TTTT bridge and used as FIP. The sequences of the B1c and B2 oligonucleotides have preferably been linked by a TTTT bridge and used as BIP.

EXAMPLE 2 PRIMER SEQUENCES

The sequences of specific oligonucleotides used for the detection of HPV18 genetic material using LAMP technology are presented and characterized below.

1. HPV18 L1F3 oligonucleotide sequence: 5' CCTAAGAAACGTAAACGTGTT 3' (SEQ ID NO: 7) is identical to the HPV18 L1 gene (5'-3' strand) which is 3' adjacent to the HPV18 L1F2 primer.
2. HPV18 L1B3 oligonucleotide sequence: 5'CAGGAACCCTAAAATATGGATT 3' (SEQ ID NO:8) is a complementary fragment of the HPV18 L1 gene (5'-3' strand) 155 nucleotides away from the 3' end of oligonucleotide 1 which is 5' adjacent to primer B2.
3. HPV18 L1F2 oligonucleotide sequence: 5' CCCTATTTTTTTGCAGATGGC 3' (SEQ ID NO: 9) is identical to the HPV18 L1 gene (5'-3' strand) located directly at the 3' end of oligonucleotide 1.
4. HPV18 L1B2 oligonucleotide sequence: 5'CCAACAGTTAATAATCTAGAGCT 3' (SEQ ID NO:10) is a complementary fragment of the HPV18 L1 gene (5'-3' strand) 131 nucleotides away from the 3' end of oligonucleotide 1.
5. HPV18 L1F1c oligonucleotide sequence: 5' AGGAGGTGGAAGATATACGGTATT 3' (SEQ ID NO: 11) is a complementary fragment of the HPV18 L1 gene (5'-3' strand) 41 nucleotides away from the 3' end of oligonucleotide 1.
6. HPV18 L1B1c oligonucleotide sequence: 5'GGCAAGAGTTGTAAATACCGATGA 3' (SEQ ID NO:12) is identical to the HPV18 L1 gene (5'-3' strand) 70 nucleotides away from the 3' end of oligonucleotide 1.
7. HPV18 L1LoopF sequence: 5' GTCACTAGGCCGCCACAA 3' (SEQ ID NO: 15)
8. HPV18 L1LoopB oligonucleotide sequence: 5' CTCCCACAAGCATATTTTATCATGC 3' (SEQ ID NO: 16)

The sequences of the F1c and F2 oligonucleotides have been preferably linked by a TTTT bridge and used as FIP. The sequences of the B1c and B2 oligonucleotides have preferably been linked by a TTTT bridge and used as BIP.

EXAMPLE 3

The method of amplifying the HPV18 L2 and L1 HPV18 genes using the oligonucleotides characterized in example 1 and example 2 by LAMP technology with the following composition of the reaction mixture.

| HPV16 |
| --- |
| 12.5 µl WarmStart LAMP 2× Master Mix |
| 0.12 µM F3 |
| 0.12 µM B3 |
| 0.96 µM FIP |
| 0.96 µM BIP |
| 0.24 µM LoopF |
| 0.24 µM LoopB |
| BSA-0.25 mg/ml |
| D-(+)-Trehalose dihydrate-6% |

Fluorescent marker interacting with double-stranded DNA—EvaGreen ≤1× or Fluorescent dye 50× (New England Biolabs) in the amount of 0.5 µl or GreenFluorescent Dye (Lucigen) in the amount of ≤1 µl or Syto-13 ≤16 µM or SYTO-82 ≤16 μM or other fluorescent dye that interacts with double-stranded DNA at a concentration that does not inhibit the amplification reaction.

DNA template ≥5 copies/reaction

Total reaction volume made up to 25 μl with DNase and RNase free water.

| HPV18 |
|---|
| 12.5 μl WarmStart LAMP 2× Master Mix |
| 0.15 μM F3 |
| 0.15 μM B3 |
| 1.20 μM FIP |
| 1.20 μM BIP |
| 0.30 μM LoopF |
| 0.30 μM LoopB |
| BSA-0.25 mg/ml |
| D-(+)-Trehalose dihydrate-6% |

Fluorescent marker interacting with double-stranded DNA—EvaGreen ≤1× or Fluorescent dye 50× (New England Biolabs) in the amount of 0.5 μl or GreenFluorescent Dye (Lucigen) in the amount of ≤1 μl or Syto-13≤16 μM or SYTO-82≤16 μM or other fluorescent dye that interacts with double-stranded DNA at a concentration that does not inhibit the amplification reaction.

DNA template ≥5 copies/reaction

Total reaction volume made up to 25 μl with DNase and RNase free water.

EXAMPLE 4

The method of amplifying the HPV16 or L1 HPV18 L2 genes using oligonucleotides characterized in example 1 and example 2 by LAMP technology with the composition of the reaction mixture characterized in example 3 with the following temperature profile:

1) HPV16: 65° C., 30 min
2) HPV18 64° C., 40 min.
3) preferably for end-point reactions 80° C., 5 min.

EXAMPLE 5

Method of amplification and detection of HPV16 or L1 HPV18 L2 genes using oligonucleotides characterized in example 1 and example 2 in LAMP technology with the composition of the reaction mixture characterized in example 3 with the temperature profile characterized in example 4 and the detection method described below.

Fluorescent dye used, capable of interacting with double-stranded DNA, added to the reaction mixture in an amount of 1.25 μl EvaGreen 20×; 0.5 μL or a concentration of ≤1×; ≤16 μM for GreenFluorescent Dye (Lucigen), respectively; SYTO-13 and SYTO-82 before starting the reaction, realtime and/or end-point measurements. Excitation wavelength in the range similar to the FAM dye—490-500 nm (optimally 494 nm) for EvaGreen dyes; Fluorescent dye 50× (New England Biolabs), GreenFluorescent Dye (Lucigen); SYTO-13 and for the SYTO-82 dye 535 nm (optimally 541 nm) emission wavelength in the range 509-530 nm (optimally 518 nm) for EvaGreen dyes; GreenFluorescent Dye (Lucigen); SYTO-13 and for the dye SYTO-82 556 nm (optimally 560 nm), the method of detection, change registration time starting from 8 minutes from the start of the reaction for HPV16 and HPV18 and the negative control.

EXAMPLE 6

The method of preparation and lyophilization of reagents for the amplification detection and detection of the HPV16 and L1 HPV18 L2 genes with the use of oligonucleotides characterized in example 1 and example 2 by the LAMP technology with the composition of the reaction mixture characterized in example 3 with the temperature profile characterized in example 4 and the detection method described in the example 5.

EXAMPLE 7 DESCRIPTION OF THE LYOPHILIZATION PROCESS

Reaction components were mixed according to the composition described in Example 3, except the DNA template, to a total volume of 25 μl. The mixture was transferred to 0.2 ml tubes and subjected to the lyophilization process according to the parameters below.

The mixture placed in test tubes was pre-cooled to −20° C. for 8 hours. Then the lyophilization process was carried out at the temperature of −50° C. for 3.5 hours under the pressure of 5-2 mBar.

EXAMPLE 7 SENSITIVITY OF THE METHOD

The sensitivity was determined by setting a series of dilutions of standards of HPV16 and HPV18 (HPV16: Human Papillomavirus (HPV) Type 16 DNA, the WHO 1st International Standard), 06/202, NIBSC; HPV18: Human Papillomavirus (HPV) Type 18 DNA (1st WHO International Standard), 06/206, NIBSC) with a minimum viral load of 5 GEq, where product increment was measured in real time FIG. 2 and FIG. 4 (RealTime-LAMP for dilution series HPV16 (FIG. 2) and HPV18 (FIG. 4)).

The time required to detect the emitted fluorescence for individual samples is shown in Table 1 (HPV16) and Table 2 (HPV18). 5

The characterized primers allow detection for both human papillomavirus genotypes (HPV16 and HPV18) with a minimum amount of 5 GEq/μl.

TABLE 1

Time required for fluorescence detection for individual HPV16 GEq

| Sample | Time to exceed the baseline fluorescence [min] |
|---|---|
| HPV16 NTC | Not determined |
| HPV16 5 GEq | 12,963261 |
| HPV16 10 GEq | 11,581083 |
| HPV16 20 GEq | 14,098101 |
| HPV16 25 GEq | 15,726467 |
| HPV16 50 GEq | 15,248527 |
| HPV16 100 GEq | 11,441005 |
| HPV16 1000 GEq | 8,652453 |
| HPV16 10000 GEq | 7,857287 |

TABLE 1

Time required for fluorescence detection for individual HPV18 GEq

| Sample | Time to exceed the baseline fluorescence [min] |
|---|---|
| HPV18 NTC | Not determined |
| HPV18 5 GEq | 34,238747 |

TABLE 1-continued

Time required for fluorescence detection
for individual HPV18 GEq

| Sample | Time to exceed the baseline fluorescence [min] |
|---|---|
| HPV18 10 GEq | 20,652435 |
| HPV18 20 GEq | 28,449081 |
| HPV18 25 GEq | 18,165846 |
| HPV18 50 GEq | 26,238985 |
| HPV18 100 GEq | 17,889755 |
| HPV18 1000 GEq | 16,71521 |
| HPV18 10000 GEq | 14,166594 |

Figure 2:
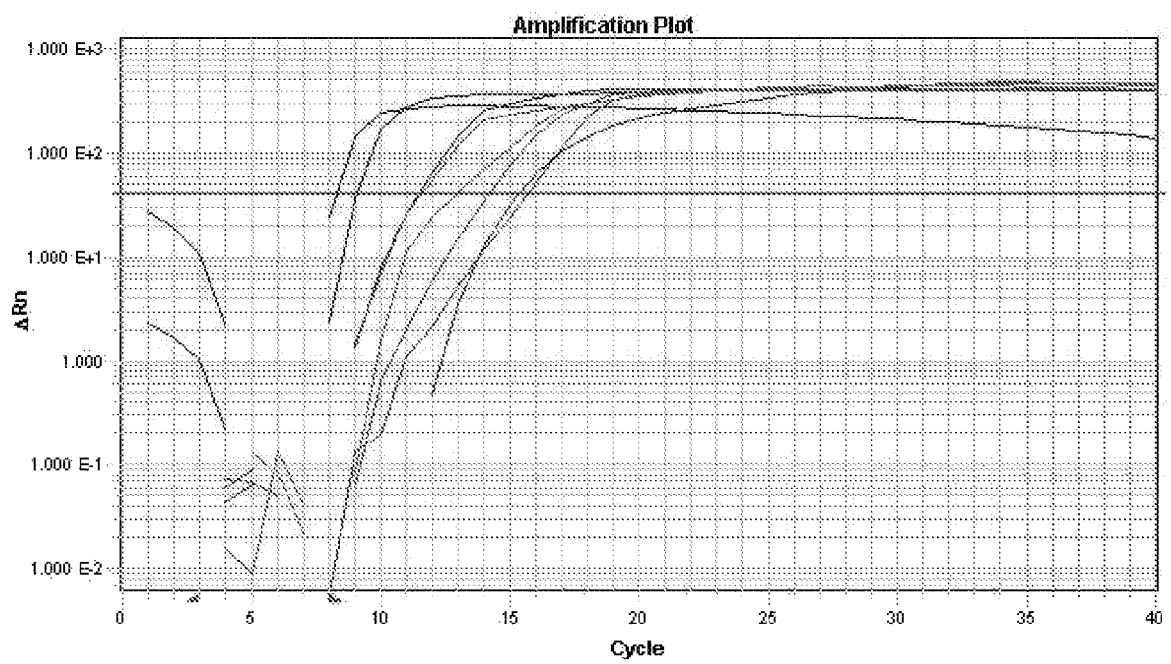
FIG. 2 illustrates the sensitivity of the method according to the invention as measured by setting a series of dilutions of DNA reference material
  HPV16: Human Papillomavirus (HPV) Type 16 DNA, $1^{st}$ WHO International Standard)—06/202, NIBSC, where the product gain was measured in real time. The real-time HPV16 detection results are shown in Table 1.
Figure 3:
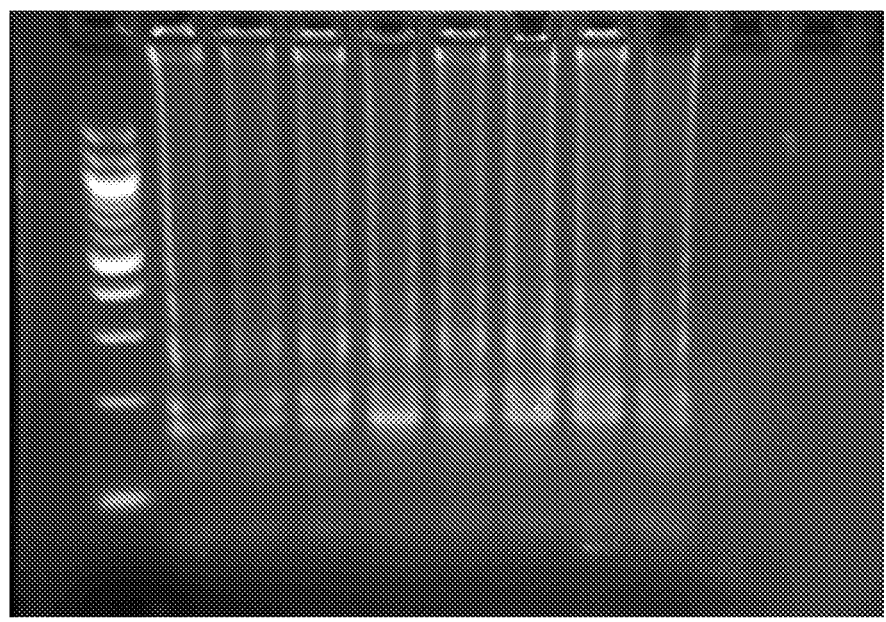
FIG. 3 (for HPV18) shows the sensitivity characteristics of the method, where a specific signal was obtained. with the matrices:
  HPV18: Human Papillomavirus (HPV) Type 18 DNA. (1st WHO International Standard)—06/206, NIBSC in the range of 10,000—5 GEq (Genomic Equivalent) HPV18, but no product in NTC.
Figure 4:
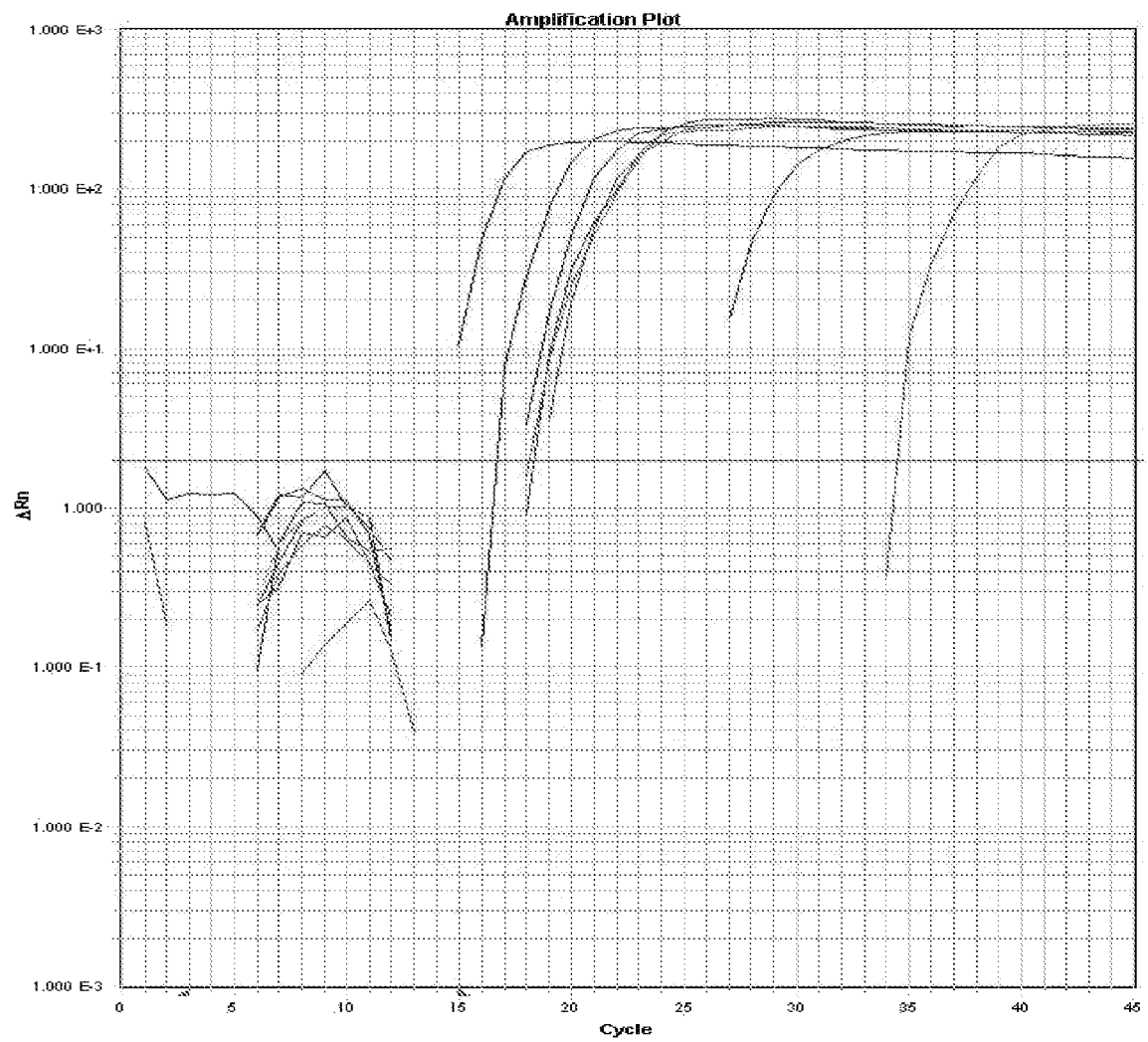
FIG. 4 illustrates the sensitivity of the method according to the invention as measured by setting a series of dilutions of DNA reference material
  HPV18: Human Papillomavirus (HPV) Type 18 DNA ($1^{st}$ WHO International Standard)—06/206, NIBSC with a minimum amount of bacteria amount of 5 GEq for HPV16 and HPV18, where the product gain was measured in real time. The real-time HPV18 detection results are shown in Table 2.
Figure 5:
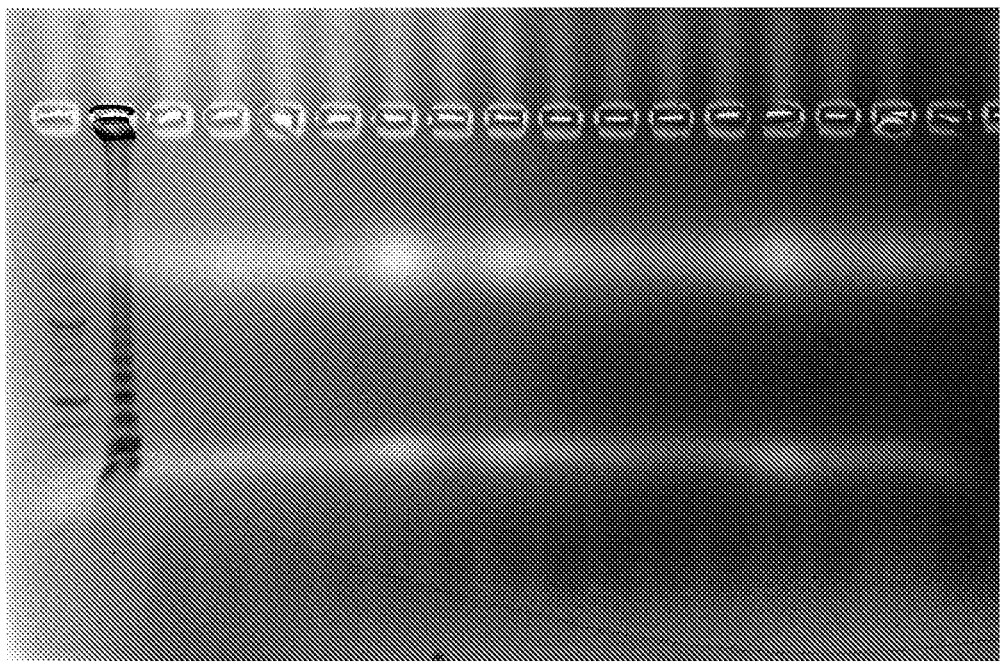
FIG. 5 illustrates the specificity of the method according to the invention with standard matrices of pathogens potentially present in the biological material to be tested as natural physiological flora, which may result from co-infection or which have similar genomic sequences.
Figure 6:
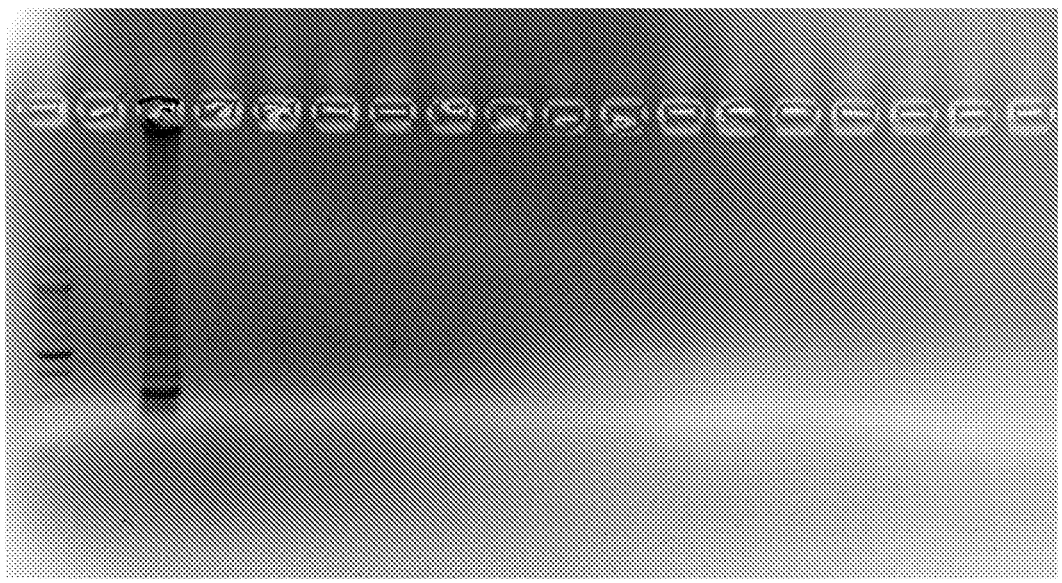
FIG. 6 illustrates the specificity of the method according to the invention with standard matrices of pathogens potentially present in the biological material to be tested as natural physiological flora, which may result from co-infection or which have similar genomic sequences.

The superiority of the amplification method and the oligonucleotides described in this specification over the tests based on RealTime-LAMP technology is due to the much higher sensitivity, which is shown in FIG. 1 and FIG. 3, and the reduction of the analysis time shown in FIG. 2 and FIG. 4 as well as table 1 and table 2.

```
Sequence List
<110> Genomtec S.A.

<120> HPV16 and HPV18 detection primer sets,
      HPV16 and HPV18 detection method using
      primer sets, and HPV16 and HPV18
      detection kits <170> PatentIn version 3.5

<210> 1 HPV16 L2F3

<211> 24

<212> DNA

<213> artificial

<223> primer

<400> 1

AAAACGTGCATCGGCTAC 18

<210> 2 HPV16 L2B3

<211> 24

<212> DNA

<213> artificial

<223> primer

<400> 2

GAGGCCTTGTTCCCAATG 18

<210> 3 HPV16 L2F2:

<211> 24

<212> DNA

<213> artificial

<223> primer

<400> 3

CATGCAAACAGGCAGGTA 18

<210> 4 HPV16 L2B2

<211> 24

<212> DNA

<213> artificial

<223> primer

<400> 4

ATATACCCAGTGCGTCCG 18

<210> 5 HPV16 L2F1C

<211> 24

<212> DNA

<213> artificial

<223> primer

<400> 5

ATTTGATCAGCAATAGTTTTGCCTT 25

<210> 6 HPV16 L2B1c

<211> 24

<212> DNA

<213> artificial

<223> primer

<400> 6

GGAAGTATGGGTGTATTTTTTGGTG 25

<210> 7 HPV18 L1F3

<211> 24

<212> DNA

<213> artificial

<223> primer

<400> 7

CCTAAGAAACGTAAACGTGTT 21

<210> 8 HPV18 L1B3

<211> 24

<212> DNA

<213> artificial

<223> primer

<400> 8

CAGGAACCCTAAAATATGGATT 22

<210> 9 HPV18 L1F2:

<211> 24

<212> DNA

<213> artificial

<223> primer

<400> 9
```

CCCTATTTTTTTGCAGATGGC 21

<210> 10 HPV18 L1B2

<211> 24

<212> DNA

<213> artificial

<223> primer

<400> 10

CCAACAGTTAATAATCTAGAGCT 23

<210> 11 HPV18 L1F1c

<211> 24

<212> DNA

<213> artificial

<223> primer

<400> 11

AGGAGGTGGAAGATATACGGTATT 24

<210> 12 HPV18 L1B1c

<211> 24

<212> DNA

<213> artificial

<223> primer

<400> 12

GGCAAGAGTTGTAAATACCGATGA 24

<210> 13 HPV16 L2LoopF

<211> 24

<212> DNA

<213> artificial

<223> primer

<400> 13

CCTTAGGTATAATGTCAGGTGGACA 25

<210> 14 HPV16 L2LoopB

<211> 24

<212> DNA

<213> artificial

<223> primer

<400> 14

GGTTAGGAATTGGAACAGGGTC 22

<210> 15 HPV18 L1LoopF

<211> 24

<212> DNA

<213> artificial

<223> primer

<400> 15

GTCACTAGGCCGCCACAA 18

<210> 16 HPV18 L1LoopB

<211> 24

<212> DNA

<213> artificial

<223> primer

<400> 16

CTCCCACAAGCATATTTTATCATGC 25

<210> 17 Gen L2 HPV16

<211> 24

<212> DNA

<213>

<223> gen

<400> 17

Gen L2 HPV16
     1  atgcgacaca aacgttctgc aaaacgcaca aaacgtgcat
        cggctaccca actttataaa
    61  acatgcaaac aggcaggtac atgtccacct gacattatac
        ctaaggttga aggcaaaact
   121  attgctgatc aaatattaca atatggaagt atgggtgtat
        ttttggtgg gttaggaatt
   181  ggaacagggt cgggtacagg cggacgcact gggtatattc
        cattgggaac aaggcctccc
   241  acagctacag atacacttgc tcctgtaaga cccccttaa
        cagtagatcc tgtgggccct
   301  tctgatcctt ctatagtttc tttagtggaa gaaactagtt
        ttattgatgc tggtgcacca
   361  acatctgtac cttccattcc cccagatgta tcaggattta
        gtattactac ttcaactgat
   421  accacacctg ctatattaga tattaataat actgttacta
        ctgttactac acataataat
   481  cccactttca ctgacccatc tgtattgcag cctccaacac
        ctgcagaaac tggagggcat
   541  tttacacttt catcatccac tattagtaca cataattatg
        aagaaattcc tatggataca
   601  tttattgtta gcacaaaccc taacacagta actagtagca
        caccatacc agggtctcgc
   661  ccagtggcac gcctaggatt atatagtcgc acaacacaac
        aggttaaagt tgtagaccct

```
-continued
 721 gcttttgtaa ccactcccac taaacttatt acatatgata
     atcctgcata tgaaggtata
 781 gatgtggata atacattata tttttctagt aatgataata
     gtattaatat agctccagat
 841 cctgactttt tggatatagt tgctttacat aggccagcat
     taacctctag gcgtactggc
 901 attaggtaca gtagaattgg taataaacaa acactacgta
     ctcgtagtgg aaaatctata
 961 ggtgctaagg tacattatta ttatgattta agtactattg
     atcctgcaga agaaatagaa
1021 ttacaaacta taacaccttc tacatatact accacttcac
     atgcagcctc acctacttct
1081 attaataatg gattatatga tatttatgca gatgacttta
     ttacagatac ttctacaacc
1141 ccggtaccat ctgtacccct tacatcttta tcaggttata
     ttcctgcaaa tacaacaatt
1201 ccttttggtg gtgcatacaa tattcctttg gtatcaggtc
     ctgatatacc cattaatata
1261 actgaccaag ctccttcatt aattcctata gttccagggt
     ctccacaata tacaattatt
1321 gctgatgcag gtgactttta tttacatcct agttattaca
     tgttacgaaa acgacgtaaa
1381 cgtttaccat attttttttc agatgtctct ttggctgcct
     ag
```

<210> 18 Gen L1 HPV18
<211> 24
<212> DNA
<213>
<223> gen
<400> 18

```
Gene L1 HPV18
   1 atgtgcctgt atacacgggt cctgatatta cattaccatc
     tactacctct gtatggccca
  61 ttgtatcacc cacggcccct gcctctacac agtatattgg
     tatacatggt acacattatt
 121 atttgtggcc attatattat tttattccta agaaacgtaa
     acgtgttccc tatttttttg
 181 cagatggctt tgtggcggcc tagtgacaat accgtatatc
     ttccacctcc ttctgtggca
 241 agagttgtaa ataccgatga ttatgtgact cccacaagca
     tattttatca tgctggcagc
```

```
-continued
 301 tctagattat taactgttgg taatccatat tttagggttc
     ctgcaggtgg tggcaataag
 361 caggatattc ctaaggtttc tgcataccaa tatagagtat
     ttagggtgca gttacctgac
 421 ccaaataaat ttggtttacc tgatactagt atttataatc
     ctgaaacaca acgtttagtg
 481 tgggcctgtg ctggagtgga aattggccgt ggtcagcctt
     taggtgttgg ccttagtggg
 541 catccatttt ataataaatt agatgacact gaaagttccc
     atgccgccac gtctaatgtt
 601 tctgaggacg ttagggacaa tgtgtctgta gattataagc
     agacacagtt atgtattttg
 661 ggctgtgccc ctgctattgg ggaacactgg gctaaaggca
     ctgcttgtaa atcgcgtcct
 721 ttatcacagg gcgattgccc ccctttagaa cttaaaaaca
     cagtttttgga agatggtgat
 781 atggtagata ctggatatgg tgccatggac tttagtacat
     tgcaagatac taaatgtgag
 841 gtaccattgg atatttgtca gtctatttgt aaatatcctg
     attatttaca aatgtctgca
 901 gatccttatg gggattccat gttttttttgc ttacggcgtg
     agcagctttt tgctaggcat
 961 ttttggaata gagcaggtac tatgggtgac actgtgcctc
     aatccttata tattaaaggc
1021 acaggtatgc ctgcttcacc tggcagctgt gtgtattctc
     cctctccaag tggctctatt
1081 gttacctctg actcccagtt gtttaataaa ccatattggt
     tacataaggc acagggtcat
1141 aacaatggtg tttgctggca taatcaatta tttgttactg
     tggtagatac cactcccagt
1201 accaatttaa caatatgtgc ttctacacag tctcctgtac
     ctgggcaata tgatgctacc
1261 aaatttaagc agtatagcag acatgttgag gaatatgatt
     tgcagtttat ttttcagttg
1321 tgtactatta ctttaactgc agatgttatg tcctatattc
     atagtatgaa tagcagtatt
1381 ttagaggatt ggaactttgg tgttcccccc cccccaacta
     ctagttttggt ggatacatat
1441 cgttttgtac aatctgttgc tattacctgt caaaaggatg
     ctgcaccggc tgaaaataag
```

-continued

```
1501  gatccctatg ataagttaaa gttttggaat gtggatttaa aggaaaagtt ttctttagac 1561  ttagatcaat atcccttgg acgtaaattt ttggttcagg ctggattgcg tcgcaagccc
```

-continued

```
1621  accataggcc ctcgcaaacg ttctgctcca tctgccacta cgtcttctaa acctgccaag 1681  cgtgtgcgtg tacgtgccag gaagtaa
```

SEQUENCE LISTING

<160> NUMBER OF SEQ ID NOS: 18

<210> SEQ ID NO 1
<211> LENGTH: 18
<212> TYPE: DNA
<213> ORGANISM: artificial
<220> FEATURE:
<223> OTHER INFORMATION: primer

<400> SEQUENCE: 1
aaaacgtgca tcggctac                                               18

<210> SEQ ID NO 2
<211> LENGTH: 18
<212> TYPE: DNA
<213> ORGANISM: artificial
<220> FEATURE:
<223> OTHER INFORMATION: primer

<400> SEQUENCE: 2
gaggccttgt tcccaatg                                               18

<210> SEQ ID NO 3
<211> LENGTH: 18
<212> TYPE: DNA
<213> ORGANISM: artificial
<220> FEATURE:
<223> OTHER INFORMATION: primer

<400> SEQUENCE: 3
catgcaaaca ggcaggta                                               18

<210> SEQ ID NO 4
<211> LENGTH: 18
<212> TYPE: DNA
<213> ORGANISM: artificial
<220> FEATURE:
<223> OTHER INFORMATION: primer

<400> SEQUENCE: 4
atatacccag tgcgtccg                                               18

<210> SEQ ID NO 5
<211> LENGTH: 25
<212> TYPE: DNA
<213> ORGANISM: artificial
<220> FEATURE:
<223> OTHER INFORMATION: primer

<400> SEQUENCE: 5
atttgatcag caatagtttt gcctt                                       25

<210> SEQ ID NO 6
<211> LENGTH: 25
<212> TYPE: DNA
<213> ORGANISM: artificial
<220> FEATURE:
```

<223> OTHER INFORMATION: primer

<400> SEQUENCE: 6
ggaagtatgg gtgtattttt tggtg                                  25

<210> SEQ ID NO 7
<211> LENGTH: 21
<212> TYPE: DNA
<213> ORGANISM: artificial
<220> FEATURE:
<223> OTHER INFORMATION: primer

<400> SEQUENCE: 7
cctaagaaac gtaaacgtgt t                                      21

<210> SEQ ID NO 8
<211> LENGTH: 22
<212> TYPE: DNA
<213> ORGANISM: artificial
<220> FEATURE:
<223> OTHER INFORMATION: primer

<400> SEQUENCE: 8
caggaaccct aaaatatgga tt                                     22

<210> SEQ ID NO 9
<211> LENGTH: 21
<212> TYPE: DNA
<213> ORGANISM: artificial
<220> FEATURE:
<223> OTHER INFORMATION: primer

<400> SEQUENCE: 9
ccctattttt ttgcagatgg c                                      21

<210> SEQ ID NO 10
<211> LENGTH: 23
<212> TYPE: DNA
<213> ORGANISM: artificial
<220> FEATURE:
<223> OTHER INFORMATION: primer

<400> SEQUENCE: 10
ccaacagtta ataatctaga gct                                    23

<210> SEQ ID NO 11
<211> LENGTH: 24
<212> TYPE: DNA
<213> ORGANISM: artificial
<220> FEATURE:
<223> OTHER INFORMATION: primer

<400> SEQUENCE: 11
aggaggtgga agatatacgg tatt                                   24

<210> SEQ ID NO 12
<211> LENGTH: 24
<212> TYPE: DNA
<213> ORGANISM: artificial
<220> FEATURE:
<223> OTHER INFORMATION: primer

<400> SEQUENCE: 12
ggcaagagtt gtaaataccg atga                                   24

```
<210> SEQ ID NO 13
<211> LENGTH: 25
<212> TYPE: DNA
<213> ORGANISM: artificial
<220> FEATURE:
<223> OTHER INFORMATION: primer

<400> SEQUENCE: 13
ccttaggtat aatgtcaggt ggaca                                          25

<210> SEQ ID NO 14
<211> LENGTH: 22
<212> TYPE: DNA
<213> ORGANISM: artificial
<220> FEATURE:
<223> OTHER INFORMATION: primer

<400> SEQUENCE: 14
ggttaggaat tggaacaggg tc                                             22

<210> SEQ ID NO 15
<211> LENGTH: 18
<212> TYPE: DNA
<213> ORGANISM: artificial
<220> FEATURE:
<223> OTHER INFORMATION: primer

<400> SEQUENCE: 15
gtcactaggc cgccacaa                                                  18

<210> SEQ ID NO 16
<211> LENGTH: 25
<212> TYPE: DNA
<213> ORGANISM: artificial
<220> FEATURE:
<223> OTHER INFORMATION: primer

<400> SEQUENCE: 16
ctcccacaag catattttat catgc                                          25

<210> SEQ ID NO 17
<211> LENGTH: 1422
<212> TYPE: DNA
<213> ORGANISM: Human Papilloma virus type 16

<400> SEQUENCE: 17
atgcgacaca aacgttctgc aaaacgcaca aaacgtgcat cggctaccca actttataaa    60
acatgcaaac aggcaggtac atgtccacct gacattatac ctaaggttga aggcaaaact   120
attgctgatc aaatattaca atatggaagt atgggtgtat tttttggtgg gttaggaatt   180
ggaacagggt cgggtacagg cggacgcact gggtatattc cattgggaac aaggcctccc   240
acagctacag atacacttgc tcctgtaaga ccccctttaa cagtagatcc tgtgggccct   300
tctgatcctt ctatagtttc tttagtggaa gaaactagtt ttattgatgc tggtgcacca   360
acatctgtac cttccattcc cccagatgta tcaggattta gtattactac ttcaactgat   420
accacacctg ctatattaga tattaataat actgttacta ctgttactac acataataat   480
cccactttca ctgacccatc tgtattgcag cctccaacac ctgcagaaac tggagggcat   540
tttacacttt catcatccac tattagtaca cataattatg aagaaattcc tatggataca   600
tttattgtta gcacaaaccc taacacagta actagtagca cacccatacc agggtctcgc   660
ccagtggcac gcctaggatt atatagtcgc acaacacaac aggttaaagt tgtagaccct   720
```

```
gcttttgtaa ccactcccac taaacttatt acatatgata atcctgcata tgaaggtata      780
gatgtggata atacattata tttttctagt aatgataata gtattaatat agctccagat      840
cctgactttt tggatatagt tgctttacat aggccagcat taacctctag gcgtactggc      900
attaggtaca gtagaattgg taataaacaa acactacgta ctcgtagtgg aaaatctata      960
ggtgctaagg tacattatta ttatgattta agtactattg atcctgcaga agaaatagaa     1020
ttacaaacta taacaccttc tacatatact accacttcac atgcagcctc acctacttct     1080
attaataatg gattatatga tatttatgca gatgacttta ttacagatac ttctacaacc     1140
ccggtaccat ctgtaccctc tacatcttta tcaggttata ttcctgcaaa tacaacaatt     1200
ccttttggtg gtgcatacaa tattccttta gtatcaggtc ctgatatacc cattaatata     1260
actgaccaag ctccttcatt aattcctata gttccagggt ctccacaata tacaattatt     1320
gctgatgcag gtgactttta tttacatcct agttattaca tgttacgaaa acgacgtaaa     1380
cgtttaccat atttttttc agatgtctct ttggctgcct ag                         1422
```

<210> SEQ ID NO 18
<211> LENGTH: 1697
<212> TYPE: DNA
<213> ORGANISM: Human Papilloma virus type 18

<400> SEQUENCE: 18

```
atacacgggt cctgatatta cattaccatc tactacctct gtatggccca ttgtatcacc       60
cacggcccct gcctctacac agtatattgg tatacatggt acacattatt atttgtggcc      120
attatattat tttattccta gaaacgtaaa acgtgttccc tatttttttg cagatggctt      180
tgtggcggcc tagtgacaat accgtatatc ttccacctcc ttctgtggca agagttgtaa      240
ataccgatga ttatgtgact cccacaagca tattttatca tgctggcagc tctagattat      300
taactgttgg taatccatat tttagggttc ctgcaggtgg tggcaataag caggatattc      360
ctaaggtttc tgcataccaa tatagagtat ttaggggtgc agttacctga ccaaataaat      420
ttggtttacc tgatactagt atttataatc ctgaaacaca acgtttagtg tgggcctgtg      480
ctggagtgga aattggccgt ggtcagcctt aggtgttggg cttagtggg catccatttt      540
ataataaatt agatgacact gaaagttccc atgccgccac gtctaatgtt tctgaggacg      600
ttagggacaa tgtgtctgta gattataagc agacacagtt atgtattttg ggctgtgccc      660
ctgctattgg ggaacactgg gctaaaggca ctgcttgtaa atcgcgtcct ttatcacagg      720
gcgattgccc cccttttagaa cttaaaaaca cagtttggga agatggtgat atggtagata      780
ctggatatgg tgccatggac tttagtacat tgcaagatac taaatgtgag gtaccattgg      840
atatttgtca gtctatttgt aaatatcctg attatttaca aatgtctgca gatcccttatg      900
gggattccat gttttttttgc ttacggcgtg agcagctttt tgctaggcat ttttggaata      960
gagcaggtac tatgggtgac actgtgcctc aatccttata tattaaaggc acaggtatgc     1020
ctgcttcacc tggcagctgt gtgtattctc cctctccaag tggctctatt gttacctctg     1080
actcccagtt gtttaataaa ccatattggt tacataaggc acagggtcat aacaatggtg     1140
tttgctggca taatcaatta tttgttactg tggtagatac cactcccagt accaatttaa     1200
caatatgtgc ttctacacag tctcctgtac ctgggcaata tgatgctacc aaatttaagc     1260
agtatagcag acatgttgag gaatatgatt tgcagtttat ttttcagttg tgtactatta     1320
cttaactgc agatgttatg tcctatattc atagtatgaa tagcagtatt ttagaggatt     1380
ggaactttgg tgttcccccc ccccaaacta ctagtttggt ggatacatat cgttttgtac     1440
```

-continued

```
aatctgttgc tattacctgt caaaaggatg ctgcaccggc tgaaaataag gatccctatg    1500
ataagttaaa gttttggaat gtggatttaa aggaaaagtt ttctttagac ttagatcaat    1560 atcccttgg  acgtaaattt ttggttcagg ctggattgcg tcgcaagccc accataggcc    1620
ctcgcaaacg ttctgctcca tctgccacta cgtcttctaa acctgccaag cgtgtgcgtg    1680
tacgtgccag gaagtaa                                                   1697
```

The invention claimed is:

1. A primer set for amplifying the nucleotide sequence of the L2 gene of human papillomavirus type 16 (HPV16) or L1 gene of human papillomavirus type 18 (HPV18), comprising:
  a) an internal primer set for HPV16 with the following nucleotide sequences:
    a primer with the nucleotide sequence 5' CATGCAAACAGGCAGGTA 3' (SEQ ID NO: 3) or a sequence resulting from a single nucleotide exchange, single nucleotide substitution, or single nucleotide deletion of SEQ ID NO: 3, linked by a TTTT bridge to the sequence 5' ATTTGATCAGCAATAGTTTTGCCTT 3'-(SEQ ID NO: 5) or a sequence resulting from a single nucleotide exchange, single nucleotide substitution, or single nucleotide deletion of SEQ ID NO: 5, and
    a primer with the nucleotide sequence 5' ATATACCCAGTGCGTCCG 3'-(SEQ ID NO: 4) or a sequence resulting from a single nucleotide exchange, single nucleotide substitution, or single nucleotide deletion of SEQ ID NO: 4, linked by a TTTT bridge with the sequence 5' GGAAGTATGGGTGTATTTTTTGGTG 3'-(SEQ ID NO: 6) or a sequence resulting from a single nucleotide exchange, single nucleotide substitution, or single nucleotide deletion of SEQ ID NO: 6; and
  b) an external primer set for HPV16 with the following nucleotide sequences:
    a primer with the nucleotide sequence 5' AAAACGTGCATCGGCTAC 3' (SEQ ID NO: 1) or a sequence resulting from a single nucleotide exchange, single nucleotide substitution, or single nucleotide deletion of SEQ ID NO: 1, and
    a primer with the nucleotide sequence 5' GAGGCCTTGTTCCCAATG 3' (SEQ ID NO: 2) or a sequence resulting from a single nucleotide exchange, single nucleotide substitution, or single nucleotide deletion of SEQ ID NO: 2; or
  c) an internal primer set for HPV18 with the following nucleotide sequences
    a primer with the nucleotide sequence 5' CCCTATTTTTTTGCAGATGGC 3' (SEQ ID NO: 9) or a sequence resulting from a single nucleotide exchange, single nucleotide substitution, or single nucleotide deletion of SEQ ID NO: 9, linked by a TTTT bridge with the nucleotide sequence 5' AGGAGGTGGAAGATATACGGTATT 3' (SEQ ID NO: 11) or a sequence resulting from a single nucleotide exchange, single nucleotide substitution, or single nucleotide deletion of SEQ ID NO: 11, and
    a primer with the nucleotide sequence 5' CCAACAGTTAATAATCTAGAGCT 3'-(SEQ ID NO: 10) or a sequence resulting from a single nucleotide exchange, single nucleotide substitution, or single nucleotide deletion of SEQ ID NO: 10, linked by a TTTT bridge with the sequence 5' GGCAAGAGTTGTAAATACCGATGA 3' (SEQ ID NO: 12) or a sequence resulting from a single nucleotide exchange, single nucleotide substitution, or single nucleotide deletion of SEQ ID NO: 12, and
  d) an external primer set for HPV18 with the following nucleotide sequences:
    a primer with the nucleotide sequence 5' CCTAAGAAACGTAAACGTGTT 3' (SEQ ID NO: 7) or a sequence resulting from a single nucleotide exchange, single nucleotide substitution, or single nucleotide deletion of SEQ ID NO: 7, and
    a primer with the nucleotide sequence 5' CAGGAACCCTAAAATATGGATT 3' (SEQ ID NO: 8) or a sequence resulting from a single nucleotide exchange, single nucleotide substitution, or single nucleotide deletion of SEQ ID NO: 8.

2. The primer set of claim 1, further comprising a set of loop primers comprising:
  a primer with the nucleotide sequence 5' CCTTAGGTATAATGTCAGGTGGACA 3' (SEQ ID NO: 13) or a sequence resulting from a single nucleotide exchange, single nucleotide substitution or single nucleotide deletion thereof, and
  a primer with the nucleotide sequence 5' GGTTAGGAATTGGAACAGGGTC 3' (SEQ ID NO: 14) or a sequence resulting from a single nucleotide exchange, single nucleotide substitution or single nucleotide deletion thereof.

3. The primer set of claim 1, further comprising a set of loop primers comprising:
  a primer with the nucleotide sequence 5' GTCACTAGGCCGCCACAA 3' (SEQ ID NO: 15) or a sequence resulting from a single nucleotide exchange, single nucleotide substitution or single nucleotide deletion thereof, and
  a primer with the nucleotide sequence 5' CTCCCACAAGCATATTTTATCATGC 3' (SEQ ID NO: 16) or a sequence resulting from single nucleotide exchange, single nucleotide substitution or single nucleotide deletion thereof.

4. The primer set of claim 1, comprising a primer with the nucleotide sequence 5' CATGCAAACAGGCAGGTA 3' (SEQ ID NO: 3), a primer with the nucleotide sequence 5' ATATACCCAGTGCGTCCG 3'-(SEQ ID NO: 4), a primer with the nucleotide sequence 5' AAAACGTGCATCGGCTAC 3' (SEQ ID NO: 1), and a primer with the nucleotide sequence 5' GAGGCCTTGTTCCCAATG 3' (SEQ ID NO: 2).

5. The primer set of claim 1, comprising a primer with the nucleotide sequence 5' CCCTATTTTTTTGCAGATGGC 3' (SEQ ID NO: 9), a primer with the nucleotide sequence 5'

CCAACAGTTAATAATCTAGAGCT 3'-(SEQ ID NO: 10), a primer with the nucleotide sequence 5' CCTAAGAAACGTAAACGTGTT 3' (SEQ ID NO: 7), and a primer with the nucleotide sequence 5' CAGGAACCCTAAAATATGGATT 3' (SEQ ID NO: 8).

6. A kit for detecting HPV16 or HPV18 infections, comprising the primer set of claim 1.

7. The kit claim 6, further comprising a set of loop primers comprising:
   a primer with the nucleotide sequence 5' CCTTAGGTATAATGTCAGGTGGACA 3' (SEQ ID NO: 13) or a sequence resulting from a single nucleotide exchange, single nucleotide substitution or single nucleotide deletion thereof, and
   a primer with the nucleotide sequence 5' GGTTAGGAATTGGAACAGGGTC 3' (SEQ ID NO: 14) or a sequence resulting from a single nucleotide exchange, single nucleotide substitution or single nucleotide deletion thereof.

8. The kit claim 6, further comprising a set of loop primers comprising:
   a primer with the nucleotide sequence 5' GTCACTAGGCCGCCACAA 3' (SEQ ID NO: 15) or a sequence resulting from a single nucleotide exchange, single nucleotide substitution or single nucleotide deletion thereof, and
   a primer with the nucleotide sequence 5' CTCCCACAAGCATATTTTATCATGC 3' (SEQ ID NO: 16) or a sequence resulting from single nucleotide exchange, single nucleotide substitution or single nucleotide deletion thereof.

9. A method of detecting Human papillomavirus type 16 or type 18, comprising amplifying a selected region of the HPV16 or HPV18 nucleic sequence with a primer set of claim 1.

10. The method of claim 9, further comprising amplifying with a set of loop primers comprising:
    a primer with the nucleotide sequence 5' CCTTAGGTATAATGTCAGGTGGACA 3' (SEQ ID NO: 13) or a sequence resulting from a single nucleotide exchange, single nucleotide substitution or single nucleotide deletion thereof, and
    a primer with the nucleotide sequence 5' GGTTAGGAATTGGAACAGGGTC 3' (SEQ ID NO: 14) or a sequence resulting from a single nucleotide exchange, single nucleotide substitution or single nucleotide deletion thereof.

11. The method of claim 9, further comprising amplifying with a set of loop primers comprising:
    a primer with the nucleotide sequence 5' GTCACTAGGCCGCCACAA 3' (SEQ ID NO: 15) or a sequence resulting from a single nucleotide exchange, single nucleotide substitution or single nucleotide deletion thereof, and
    a primer with the nucleotide sequence 5' CTCCCACAAGCATATTTTATCATGC 3' (SEQ ID NO: 16) or a sequence resulting from single nucleotide exchange, single nucleotide substitution or single nucleotide deletion thereof.

* * * * *